United States Patent
Jahromi (10) Patent No.: US 9,746,660 B2
(45) Date of Patent: Aug. 29, 2017

(54) BINOCULAR TELESCOPE WITH CONTROLLED PARALLAX

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

( * ) Notice: Subject to any disclaimer, the term of this patent is extended or adjusted under 35 U.S.C. 154(b) by 0 days.

(21) Appl. No.: 14/645,382

(22) Filed: Mar. 11, 2015

(65) Prior Publication Data

US 2016/0266371 A1  Sep. 15, 2016

(51) Int. Cl.
*G02B 23/18* (2006.01)
*G02B 23/12* (2006.01)
(Continued)

(52) U.S. Cl.
CPC .............. *G02B 23/02* (2013.01); *G02B 23/18* (2013.01); *G02B 27/2242* (2013.01)

(58) Field of Classification Search
CPC ........ G02B 23/12; G02B 13/14; G02B 15/02; G02B 15/04; G02B 15/14; G02B 15/173; G02B 13/18; G02B 23/00; G02B 13/143; G02B 1/02; G02B 13/00; G02B 19/00; G02B 27/0025; G02B 21/245; G02B 23/16; G02B 23/06; G02B 7/183; G02B 23/08; G02B 23/14; G02B 23/02; G02B 7/002; G02B 7/12; G02B 15/00; G02B 23/18; G02B 7/06; G02B 23/10; G02B 27/2228; G02B 25/002; G02B 27/2214; G02B 27/2257; G02B 27/2242; G02B 27/2235; G02B 5/30; G02B 27/017; G02B 27/0172; G02B 25/004; G02B 25/02; G02B 27/283; G02B 27/286; G02B 27/285; G02B 5/04; G02B 3/10; G02B 5/3083; G02B 25/04; G02B 9/34; G02B 13/04; G02B 23/22; G02B 7/022; G02B 5/124; G02B 5/126; G02B 5/08; G02B 5/128; G02B 25/001; G02B 27/421; G02B 27/0972;
(Continued)

(56) References Cited

U.S. PATENT DOCUMENTS 3,524,702 A * 8/1970 Bellows ................. A61B 3/103
                                                351/205
4,217,048 A * 8/1980 Egawa .................. G03B 19/12
                                                351/241

(Continued)

*Primary Examiner* — Bumsuk Won
*Assistant Examiner* — Henry Duong (57) ABSTRACT

This invention teaches a binocular telescope wherein wedge prisms are positioned in the optical path of each telescope to control the amount of perceived parallax between the left and the right images. In one embodiment, a pair of thin wedge prisms are positioned in front of the objective lenses to optically manipulate the real convergence angle of an object viewed through the binocular telescope. In a second embodiment, wedge prisms are positioned after the eyepiece lenses to manipulate the apparent convergence angle of an object viewed through the binocular telescope. Depending on the position and the orientation of the wedge prisms, the invention produces benefits such as better depth perception, increased field of view, and the possibility to view close objects.

9 Claims, 6 Drawing Sheets

(51) Int. Cl.
*G02B 23/00* (2006.01)
*G02B 7/12* (2006.01)
*G02B 7/06* (2006.01)
*G02B 23/02* (2006.01)
*G02B 27/22* (2006.01)

(58) Field of Classification Search
CPC .... G02B 27/09; G02B 13/08; G02B 27/0916; G02B 13/10; G02B 13/007; G02B 13/009; G02B 17/086; H04N 5/33; H04N 13/0404; H04N 13/0497; H04N 13/0409; H04N 13/0055; H04N 5/23293; G03F 7/70241; C03C 3/06; F21V 5/04; B60R 1/10; F41G 1/40; B23Q 17/24; B23Q 17/2404; B27C 1/14; G01B 9/00; G01G 23/32; G01G 23/34; G01G 23/22; G01F 15/00; G03B 21/602; G03B 21/625; G03B 3/00; B60J 3/02; A61B 3/132; A61B 3/14; A61B 1/07; C09H 1/04; C12N 9/58; C12N 9/62; G02C 7/08; G02C 7/02; G02C 7/049; G02C 7/14; G02F 1/13362; G02F 2001/13355; B29C 33/0038; B29D 11/00413; B29D 11/00528; B29D 11/0073; B29L 2031/7602; A61F 2/1618; E06B 7/30; E06B 9/24; E06B 9/386; E01F 9/015; F21S 11/00; E04C 2/54; E04D 13/033

USPC ....... 359/353, 354, 355, 362, 364, 365, 368, 359/374, 375, 376, 377, 379, 380, 381, 359/382, 383, 384, 399, 402, 404, 407, 359/410, 413, 438, 440, 448, 462, 473, 359/475, 476, 480, 481, 482, 485.07, 359/485.06, 489.14, 489.18, 504, 506, 359/514, 643, 669, 678, 596

See application file for complete search history.

(56) References Cited

U.S. PATENT DOCUMENTS

| | | | |
|---|---|---|---|
| 4,264,122 A | | 4/1981 | Schmidt et al. |
| 4,518,231 A | * | 5/1985 | Muchel .................. G02B 21/22 359/377 |
| 4,717,239 A | * | 1/1988 | Steenblik ................ G02B 5/04 348/E13.033 |
| 4,779,965 A | * | 10/1988 | Beecher ................ G02B 21/20 359/376 |
| 6,134,048 A | | 10/2000 | Kato et al. |
| 2010/0188744 A1 | * | 7/2010 | Hengst ................... G02B 23/18 359/413 |
| 2013/0093857 A1 | * | 4/2013 | Yanagita ................ G03B 35/10 348/47 |
| 2014/0168381 A1 | * | 6/2014 | Wada ................ H04N 13/0022 348/47 |
| 2014/0177043 A1 | * | 6/2014 | Togino ............... A61B 1/00193 359/367 |

* cited by examiner

BINOCULAR TELESCOPE WITH CONTROLLED PARALLAX

I. CROSS-REFERENCE TO RELATED APPLICATIONS

Not Applicable.

II. FIELD OF THE INVENTION

This application relates to binoculars, specifically to controlling the amount of visual parallax perceived by a human observer when using a pair of binoculars.

III. BACKGROUND OF THE INVENTION

Binoculars or binocular telescopes are a pair of identical telescopes mounted side-by-side and aligned to point accurately in the same direction. Binoculars allow the viewer to use both eyes when viewing distant objects. Furthermore, binoculars give viewers a three-dimensional image: for nearer objects the two views, presented to each of the viewer's eyes from slightly different viewpoints, produce a merged view with an impression of depth.

Binoculars are used by hunters, bird watcher, and other nature enthusiasts. By design, binoculars are intended for viewing distant objects. However, it will be desirable if the viewer can use his binoculars not only for viewing distant objects but also for viewing objects as close as one meter. This will allow the viewer to use his binoculars for observing many interesting objects such as outdoor plants, flowers, butterflies, dragonflies, etc.

Humans have two eyes with overlapping visual fields that use parallax to gain depth perception. Parallax is a displacement or difference in the apparent position of an object viewed along two different lines of sight, and is measured by the convergence angle between those two lines. Nearby objects have a larger parallax than more distant objects.

When an object at a close distance is viewed through binoculars, parallax may become too large. This is because the apparent convergence angle, i.e. the angle of the light beams exiting from the right and left eyepiece lenses, is magnified by the binoculars. For example, when an observer views an object at a distance of one meter using binoculars having a magnification of 10x, the observer needs to turn his eyes inward (make the eye axes converge) so much as if viewing an object at a distance of 10 cm. This excessive parallax greatly strains the observers eyes. In such a situation, many people simply cannot merge the right and left images into one.

Several approaches have been taken in the prior art to reduce the excessive parallax produced by binoculars when viewing close objects. U.S. Pat. No. 4,264,122 issued on Apr. 28, 1981 to Schmidt et al. teaches a binocular telescope wherein the angle between left and right telescopes' optical axes can be adjusted using an articulating hinge mechanism. An alternative solution is disclosed in U.S. Pat. No. 6,134,048 issued on Oct. 17, 2000 to Kato et al. wherein the excessive convergence angle is corrected by a mechanism that decanters an element of the objective lens system.

While it is advantages to reduce parallax when viewing nearby objects, in some other applications it might be desirable to increase the parallax between the left and right images. For instance, when observing objects located several hundred meters or more, increasing parallax helps provide an enhanced three-dimensional viewing experience.

It is also possible to increase the horizontal field of view of binoculars by making the left an right telescopes have divergent fields of view.

The present invention introduces a novel solution for correcting or adjusting the convergence angle in binocular telescopes: A pair of wedge prisms are introduced in the optical path of the left and right telescopes to optically steer their fields of view. Parallax correction can be applied to binoculars' real field of view (objective end) or to their apparent filed of view (eyepiece end).

IV. SUMMARY OF THE INVENTION

In accordance with one embodiment, a pair of wedge prisms are mounted behind the eyepieces of a binocular telescope to bend the direction of the light beams exiting from the two eyepieces. This can help increase or decrease the amount of perceived parallax between left and right images resulting in several desirable features.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

VI. DETAILED DESCRIPTION OF THE INVENTION

A. Principle of Operation

Figure 1:
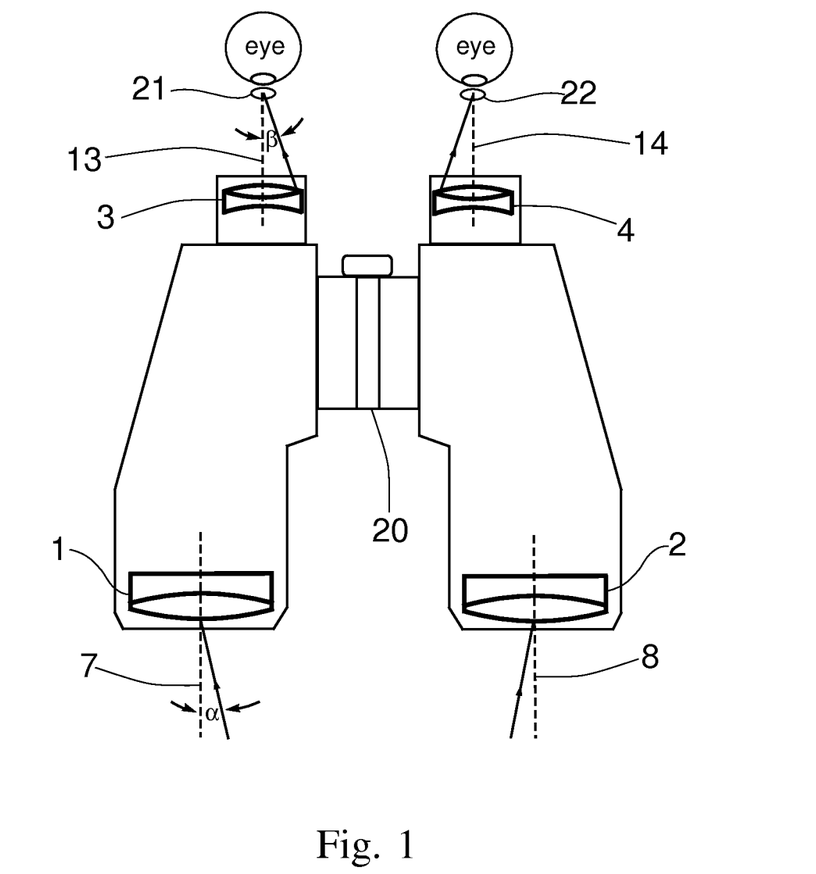
FIG. 1 is a top view schematic depicting the optical layout of a binocular telescope.

Consider the optical diagram shown in FIG. 1. This diagram shows a pair of binoculars comprising two identical telescopes mounted side-by-side. The telescope on the left side of the diagram has an objective lens 1 and an eyepiece lens 3. Similarly, the telescope on the right side of the diagram has an objective lens 2 and an eyepiece lens 4. For simplicity, we will use the terms "left telescope" and "right telescope" when referring to the individual telescopes that form the binoculars. With reference to FIG. 1, the left telescope has an objective optical axis 7 and an eyepiece optical axis 13. Similarly, the right telescope has an objective optical axis 8 and an eyepiece optical axis 14. Furthermore, both telescopes have an "exit pupil" which is a hypothetical pupil located behind their eyepiece. In FIG. 1, the exit pupils are designated by circles 21 and 22. To see the full field of view, the observer must position his eyes on the exist pupils. The left and right telescopes are usually attached together using a hinge 20 so that the user can adjust the "interpupillary distance" of the binoculars. With reference to FIG. 1, the interpupillary distance is the distance between the left eyepiece optical axis 13 and the right eyepiece optical axis 14.

When observing an object through binoculars, the object is seen at slightly different field angles by the left and right objective lenses. For simplicity, we assume that the object is equally distant from the left and right objective lenses. In this case, it will be seen at the same field angle $\alpha$ (albeit at different sides of the optical axis) by the left and right telescopes. From the point of view of parallax analysis, we call the angle $\alpha$ "real convergence angle". It is easy to see that $\alpha$ decreases as the object distance increases.

At their eyepiece side, binoculars create two magnified and slightly different images of the object. These differences are represented by the "apparent convergence angle" $\beta$. It is this apparent convergence angle that provides information that the brain uses to calculate depth in the visual scene. To a first-order approximation, $\beta=M\alpha$ where M is the magnification of the binoculars.

From the above description it is evident that one can control the amount of perceived parallax by manipulating the apparent convergence angle $\beta$, the real convergence angle $\alpha$, or both. In the present invention we use thin wedge prisms to control the angles $\alpha$ or $\beta$ without any change to the original collimation state of the binoculars. Several preferred embodiments of the invention are discussed next.

B. First Embodiment of the Invention

Figures 2A, 2B:
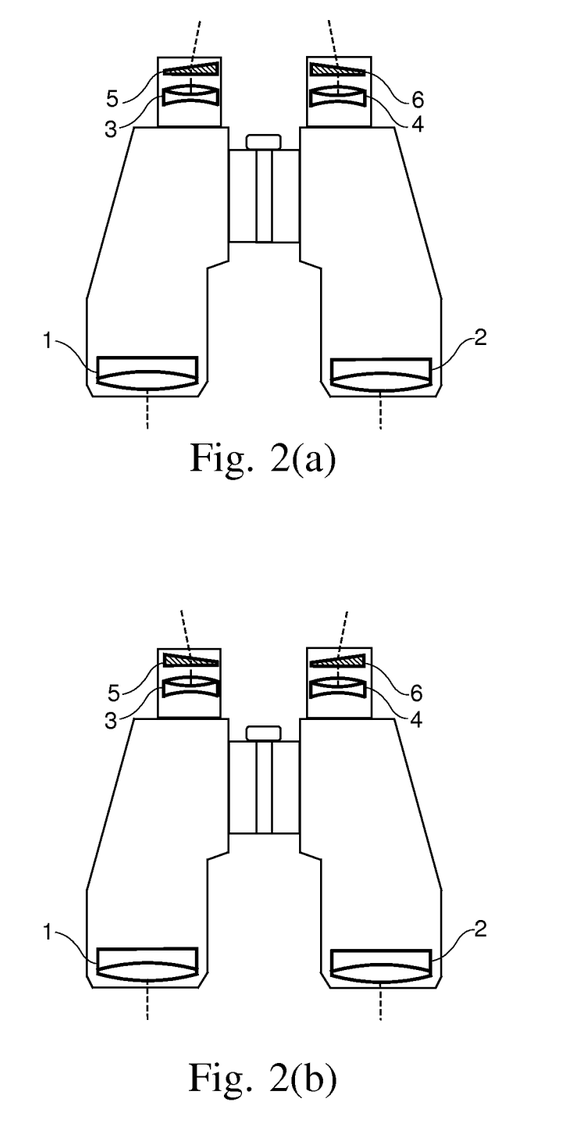
FIGS. 2(a) and 2(b) are top view schematics depicting a binocular telescope with wedge prisms mounted at the eyepiece end according to a first embodiment of the invention.

A first embodiment of the invention is shown in FIGS. 2(a) and 2(b). With reference to FIG. 2(a), a binocular telescope includes a pair of wedge prisms 5 and 6 mounted behind the eyepiece lenses 3 and 4. The wedge prisms are mounted on the optical axes of the eyepiece lenses such that the base of the left wedge prism faces the base of the right wedge prism. The optical effect of this arrangement is equivalent to bending the optical axes of the eyepiece lenses inwards. The prisms reduce the apparent value of the convergence angle $\beta$ perceived by the observer. This effect is advantages for reducing excessive parallax when viewing close objects through binoculars.

FIG. 2(b) shows a variation of this embodiment in which the wedge prisms 5 and 6 mounted such that the apex of the left wedge prism faces the apex of the right wedge prism. In this configuration, the perceived parallax between the image produced by the left and right telescopes is increased. This effect can provide a better three-dimensional viewing experience when observing distant objects through binoculars.

C. Second Embodiment of the Invention

Figure 3A:
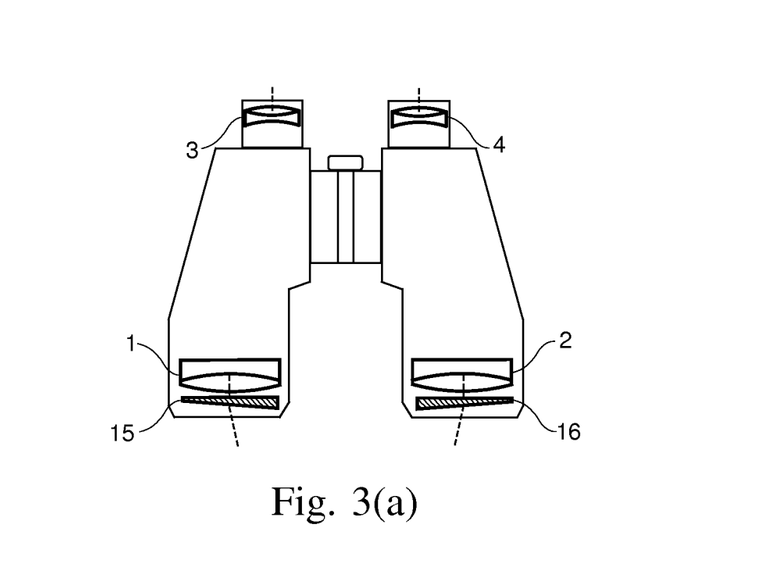
FIGS. 3(a) and 3(b) are top view schematics depicting a binocular telescope featuring wedge prisms mounted at the objective end according to a second embodiment of the invention.
Figure 3B:
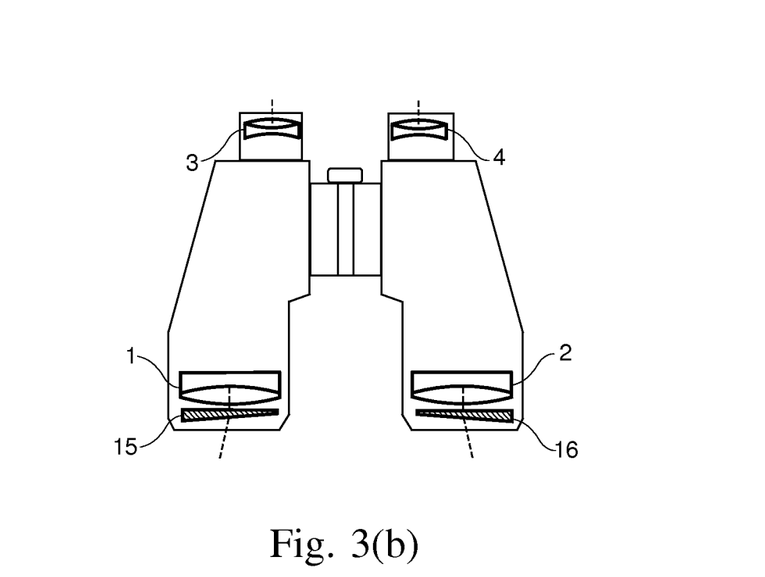

A second embodiment of the invention is shown in FIGS. 3(a) and 3(b). With reference to FIG. 3(a), a binocular telescope includes a pair of wedge prisms 15 and 16 mounted in front of the objective lenses 1 and 2. The wedge prisms are mounted on the optical axes of the objective lenses such that the base of the left wedge prism faces the base of the right wedge prism. The optical effect of this arrangement is equivalent to bending the optical axes of the objective lenses inwards. As a result the objective lenses will see a close object at a reduced convergence angle. This effect is advantages for reducing excessive parallax when viewing close objects through binoculars.

FIG. 3(b) shows a variation of this embodiment where the wedge prisms 15 and 16 are mounted such that the apex of the left wedge prism faces the apex of the right wedge prism. In this configuration, the parallax between the image seen by the left and right telescopes' objectives is increased. This provides a better three-dimensional viewing experience when observing distant objects.

Figure 4A:
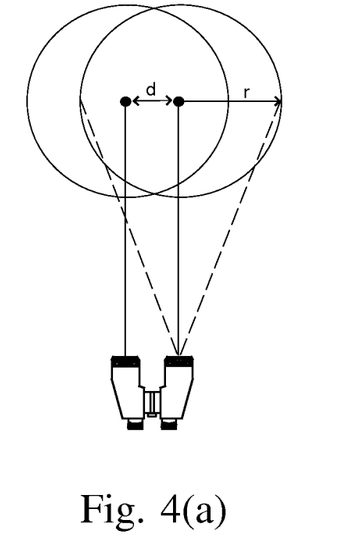
FIG. 4(a) shows the field of view of binoculars with individual fields of view of left and right telescopes pointing in the same direction.
Figure 4B:
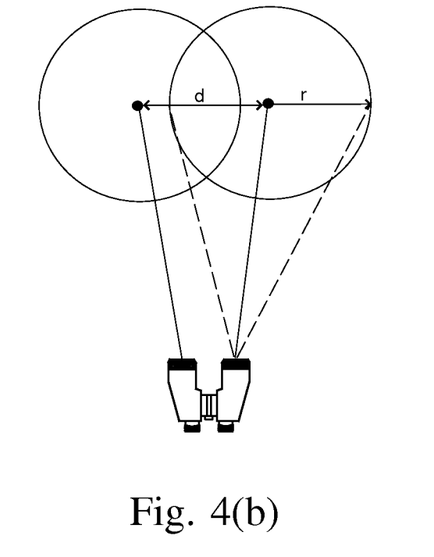
FIG. 4(b) shows the field of view of binoculars with left and right telescopes having divergent fields of view.

A further advantage of the configuration shown in FIG. 3(b) is that it increases the horizontal field of view of the binoculars. With reference to FIG. 4(a), in conventional binoculars the left and right telescopes are mounted side-by-side such that they point to the same direction. With reference to this figure, at a certain distance, say 1000 m, the left and right telescopes of a conventional binoculars have a field of view with radius r. The distance d between the center of left and right fields of view is equal to the distance between the objective lenses. In typical hand-held binoculars, r>>d. For instance, in Leica 10×50 BN binoculars d≈6.5 cm and r≈57 m at 1000 m. This means, the effective horizontal filed of view of the binoculars will be approximately 2r. However, if the field of the binoculars are divergent as shown in FIG. 4(b), then the effective horizontal field of view of the binoculars is increased. For example, if d is increased so that d≈r, then the effective horizontal field of view of the binoculars will be 3r which represent a 50 percent increase. Note from FIG. 4(b) that by making d≈r, a considerable amount of overlap still exists between left and right fields of view so stereo vision is maintained.

D. Third Embodiment of the Invention

Figure 5:
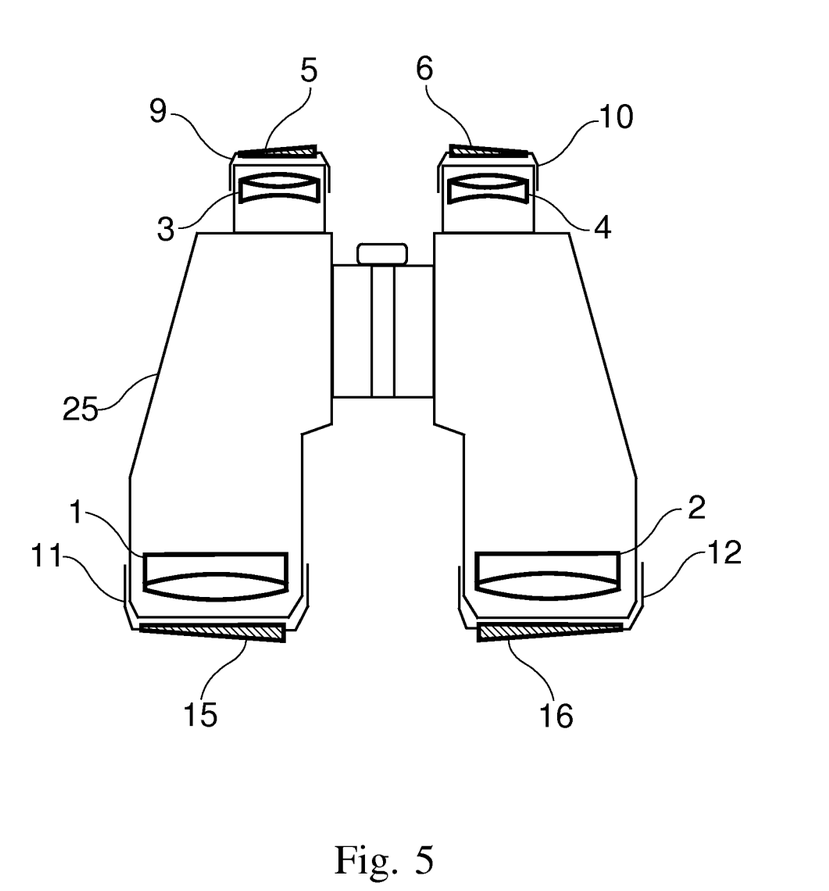
FIG. 5 is a top view schematic depicting a binocular telescope wherein wedge prisms are mounted detachably according to the third embodiment of the invention.

A third embodiment of the invention is shown in FIG. 5. With reference to FIG. 5, the invention comprises a first pair of wedge prisms 15 and 16 mounted in a first pair of housing means 11 and 12. The housing means 11 and 12 are designed such that they can be detachably mounted onto a binoculars 25 such that the wedge prism 15 and 16 are positioned in front of the objective lenses 1 and 2. In addition, the housing means 11 and 12 are designed to position the wedge prisms 15 and 16 such that either their apexes face each other or their bases face each other.

Optionally, this embodiment of the invention may include a second pair of wedge prisms 5 and 6 mounted in a second pair of housing means 9 and 10. The housing means 9 and 10 are designed such that they can be detachably mounted onto a binoculars 25 such that the wedge prism 5 and 6 are positioned behind the eyepiece lenses 3 and 4. Furthermore, the housing means 9 and 10 are designed to position the wedge prism 5 and 6 such that either their apexes face each other or their bases face each other.

The housing means 9, 10, 11, and 12 may be made using rubber or other elastic material so that they fit firmly on the body of an existing binocular. Alternatively, they may have clamps, magnets or other suitable means to detachably mount them onto the binoculars. In addition, the housing means 11 and 12 may include a hinge or joint to connect them together. Similarly, the housing means 9 and 10 may be connected together using a suitable joint as well. Persons skilled in the art of mechanical engineering would be familiar with designing and making suitable detachable housing means according to the invention.

The first pair of wedge prisms 15 and 16 and the second pair of wedge prisms 5 and 6 may be used together or separately. They can be designed to increase parallax or decrease it as desired by the user.

The present embodiment has the advantage that it can be attached to an existing binoculars.

E. Advantages

Based on the above descriptions of the invention, a number of advantages over prior art are readily apparent:
1. In at least one embodiment of the invention, the binoculars can be used for viewing close objects without eye strain or fatigue.
2. In at least one embodiment of the invention, the user is provided with enhanced three-dimensional viewing when observing distant objects.
3. At least one embodiment of the invention increases the horizontal field of view of the binoculars.
4. The invention can be attached to existing binoculars reducing production costs and providing greater flexibility for the user.
5. The invention does not require tilting the left and right telescopes mechanically. Therefore, it does not interfere with the center-focus mechanism used in many modern binoculars.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Figure 6A:
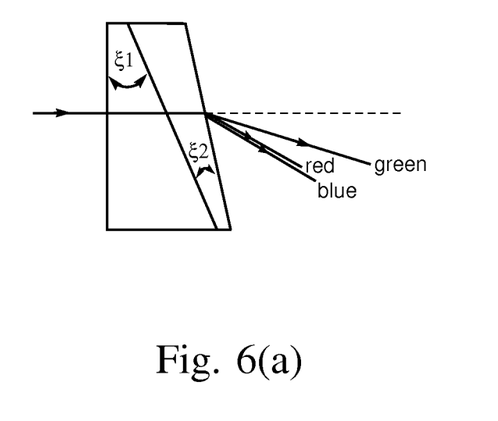
FIG. 6(a) shows an achromatic prism.
Figure 6B:
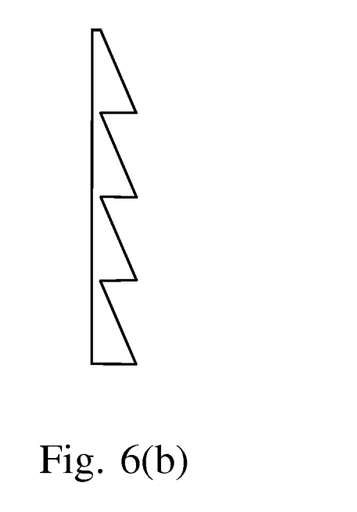
FIG. 6(b) shows a Fresnel prism.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:
1. It might be advantageous to use achromatic prisms to reduce chromatic dispersion. An achromatic prism is shown in FIG. 6(a). With reference to this figure, an achromatic prism is composed of two prisms of different transparent substances which have unequal dispersive powers, e.g. flint glass and crown glass. In an achromatic prism the difference of dispersive power is compensated by giving the prisms different refracting angles $\xi_1$ and $\xi_2$, so that the achromatic prism produces the same angular deviation at red and blue wavelengths. Persons skilled in the art of optical engineering would be familiar with designing and making achromatic prisms that suit the present invention.
2. It might be advantageous to use Fresnel prisms to reduce the weight and bulk of wedge prisms, especially when they are mounted on the objective side of the binoculars as in the second embodiment of the invention. A Fresnel prism is shown in FIG. 6(b). By designing the prism as a series of small segments, rather than one large prism, a substantial amount of its weight could be removed. Persons skilled in the art of optical engineering would be familiar with designing and making Fresnel prisms that would suite the present invention.

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:
1. A binocular viewing instrument for providing a magnified stereoscopic image of an object to a user comprising a first telescope and a second telescope, said first telescope and said second telescope being mounted side by side, said first telescope and said second telescope each comprising
   a. an objective lens,
   b. an eyepiece lens, said eyepiece lens having an optical axis and an exit pupil, said exit pupil being located on the eyepiece optical axis at a predetermined distance behind said eyepiece, and
   c. a wedge prism, said wedge prism having an apex and a base, said wedge prism being mounted after said eyepiece lens on said optical axis, said wedge prism being mounted before said exit pupil
wherein the wedge prisms are oriented such that
   i. the base of the wedge prism in said first telescope faces the base of the wedge prism in said second telescope in order to bend the optical axes of the first telescope's eyepiece lens and the second telescope's eyepiece lens towards each other such that the apparent convergence angle $\beta$ associated with the stereoscopic view of an object located at a short distance in front of the binocular viewing instrument is reduced, or
   ii. the apex of the wedge prism in said first telescope faces the apex of the wedge prism in said second telescope in order to bend the optical axes of the first telescope's eyepiece lens and the second telescope's eyepiece lens away from each other such that the apparent convergence angle $\beta$ associated with the stereoscopic view of an object located at a far distance in front of the binocular viewing instrument is increased.

2. The binocular viewing instrument of claim 1 wherein the wedge prisms are achromatic.

3. The binocular viewing instrument of claim 1 wherein the wedge prisms are Fresnel prisms.

4. A binocular viewing instrument for providing a magnified stereoscopic image of an object to a user comprising a first telescope and a second telescope, said first telescope and said second telescope being mounted side by side, said first telescope and said second telescope each comprising
   a. an objective lens, said objective lens having an optical axis,
   b. an eyepiece lens, and
   c. a wedge prism, said wedge prism having an apex and a base, said wedge prism being mounted in front of said objective lens on said optical axis
wherein the wedge prisms are oriented such that
   i. the base of the wedge prism in said first telescope faces the base of the wedge prism in said second telescope in order to bend the optical axes of the first telescope's objective lens and the second telescope's objective lens towards each other such that the real convergence angle $\alpha$ associated with the stereoscopic view of an object located at a short distance in front of the binocular viewing instrument is reduced, or
  ii. the apex of the wedge prism in said first telescope faces the apex of the wedge prism in said second telescope in order to bend the optical axes of the first telescope's objective lens and the second telescope's objective lens away from each other such that the real convergence angle α associated with the stereoscopic view of an object located at a far distance in front of the binocular viewing instrument is increased.

5. The binocular viewing instrument of claim 4 wherein the wedge prisms are achromatic.

6. The binocular viewing instrument of claim 4 wherein the wedge prisms are Fresnel prisms.

7. An attachment device for use with a binocular telescope of the type that has a pair of objective lenses and a pair of eyepiece lenses, said attachment device comprising
  a. a first housing means and a second housing means, said first housing means and said second housing means being detachably mountable onto said binoculars, said first housing means and said second housing means being mountable in front of the objective lenses of said binocular telescope or behind the eyepiece lenses of said binocular telescope,
  b. a first wedge prism and a second wedge prism, said first wedge prism having an apex and a base, said second wedge prism having an apex and a base, said first prism being mounted in said first housing means, said second prism being mounted in said second housing means, said first prism and said second wedge prism being mounted such that their bases face each other or their apexes face each other whereby a user can view a stereoscopic image of an object through said binocular telescope and manipulate the apparent convergence angle β or the real convergence angle α or both without any change to the original collimation state of said binocular telescope.

8. The attachment device of claim 7 wherein said first wedge prism and said second wedge prism are achromatic prisms.

9. The attachment device of claim 7 wherein said first wedge prism and said second wedge prism are Fresnel prisms.

* * * * *